(12) United States Patent
Schulman

(10) Patent No.: US 8,341,157 B2
(45) Date of Patent: Dec. 25, 2012

(54) SYSTEM AND METHOD FOR INTENT-DRIVEN SEARCH RESULT PRESENTATION

(75) Inventor: Robert Schulman, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 307 days.

(21) Appl. No.: 12/533,299

(22) Filed: Jul. 31, 2009

(65) Prior Publication Data

US 2011/0029541 A1 Feb. 3, 2011

(51) Int. Cl.
*G06F 17/00* (2006.01)
(52) U.S. Cl. ........ 707/737; 707/706; 707/727; 707/728; 707/731; 707/735
(58) Field of Classification Search .................. 707/706, 707/727, 728, 731, 735, 737
See application file for complete search history.

(56) References Cited

U.S. PATENT DOCUMENTS

| 7,181,438 B1 * | 2/2007 | Szabo ................................. 1/1 |
| 7,689,585 B2 * | 3/2010 | Zeng et al. ............. 707/999.104 |
| 7,801,896 B2 * | 9/2010 | Szabo ........................... 707/739 |

* cited by examiner

*Primary Examiner* — Sana Al Hashemi
(74) *Attorney, Agent, or Firm* — James J. DeCarlo; Greenberg Traurig, LLP

(57) ABSTRACT

A system and method for intent driven search presentation. A query is received, over a network, from a user, wherein the query comprises at least one query token. The query is analyzed wherein at least one query keyword is identified in the query. The query is classified wherein the query is classified into at least one intent using query keywords. A plurality of data objects that match query keywords is identified. The data objects are ranked, wherein at least one intent is assigned to at least some of the data objects. A result is built using the ranked plurality of data objects, wherein the result comprises display entries wherein if a data object has been assigned at least one intent, such intent is used to construct the display entry for the respective data object. The result is transmitted over the network to the user.

23 Claims, 3 Drawing Sheets

SYSTEM AND METHOD FOR INTENT-DRIVEN SEARCH RESULT PRESENTATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for information search, retrieval and presentation and, more particularly, to systems and methods that enhance the effectiveness of information search, retrieval and presentation using user intent.

BACKGROUND OF THE INVENTION

The Internet provides a broad array of information resources that may be of interest to users. Because the quantity of information is so great, and the number of locations where such information is hosted, a large number of information search and retrieval services have evolved. Such services typically provide interfaces which allow users to issue queries to retrieve information of interest to the users. Ideally, search results should reflect the intent of the user issuing the query.

SUMMARY OF THE INVENTION

In one embodiment, the invention is a method. A query is received, over a network, from a user, wherein the query comprises at least one query token. The query is analyzed, using at least one computing device, wherein at least one query keyword is identified in the query. The query is classified, using the computing device, wherein the query is classified into at least one intent using the at least one query keyword. A plurality of data objects available over the network that match query keywords are identified. The data plurality of objects are ranked, using the computing device, wherein at least one intent is assigned to at least some of the data objects. A result is built, using the computing device, using the ranked plurality of data objects, wherein the result comprises a plurality of display entries, wherein at least one display entry is constructed for each of the ranked plurality of data objects, wherein if a data object has been assigned at least one intent, such intents are used to construct the display entry for the respective data object. The result is transmitted over the network to the user. Note that, in some embodiments, "unclassified" can be a valid intent.

In another embodiment, the invention is a system comprising a group of modules, wherein each module comprising one or more processors programmed to execute software code retrieved from a computer readable storage medium storing software for specific functions. The group of modules comprise: a query receiving module for receiving, over a network, queries from users, wherein the queries each comprise at least one query token; a query analysis module for analyzing queries received by the query receiving module wherein at least one query keyword is identified in each of the respective queries received by the query receiving module; a query intent classification module for classifying queries analyzed by the query analysis module, wherein each query is classified into at least one intent using the query's respective keywords; a query search module for identifying, for each query classified by the query intent classification module, a plurality of data objects available over the network that match the respective query keywords; a search result ranking module for ranking, for each query processed by the query search module, the respective plurality of data objects, wherein at least one of the at least one intents is assigned to at least some of the plurality of data objects; a search result presentation module for building, for each plurality of data objects ranked by the search result ranking module, a result using the respective ranked plurality of data objects, wherein the result comprises a plurality of display entries, wherein at least one display entry is constructed for each of the respective ranked plurality of data objects, wherein if a data object has been assigned at least one intent, such intents are used to construct the display entry for the respective data object; and a search result transmission module for transmitting results built by the search result presentation module, over the network, to users.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
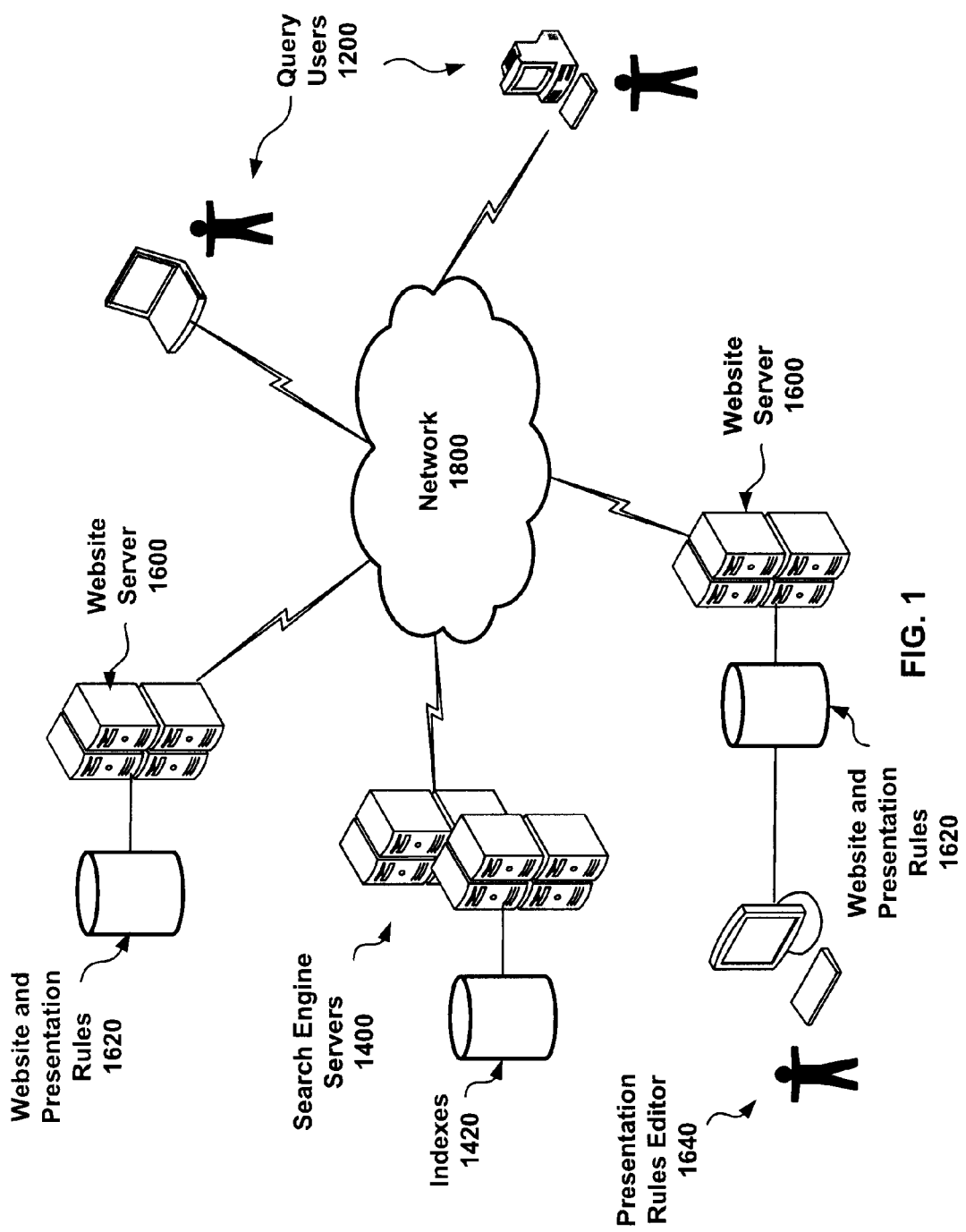
FIG. 1 illustrates one embodiment of a hardware and network configuration capable of supporting at least one embodiment of the present invention.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure the term "server" should be understood to refer to a service point which provides processing, database, and communication facilities. By way of example, and not limitation, the term "server" can refer to a single, physical processor with associated communications and/or data storage and/or database facilities, or it can refer to a networked or clustered complex of processors and associated network and/or storage devices, as well as operating software and one or more database systems and/or applications software systems (which can be implemented as modules and/or engines) which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

In one embodiment, the present invention is directed to a improvements in search engine technology that enables content owners to explicitly provide presentation suggestions that will ultimately help the end user to decide whether the landing page is relevant, and/or place the desired information directly on the search engine result page.

When a user submits a query to a web search service such as the Yahoo! or Google search services, the user generally has some intent. The user's intent may simply be to explore information available on the web relating to one or more topics, for example, a user may simply wish to browse web sites relating to "rainforests" without having any specific purpose in mind. Commonly, however, a user has a more focused purpose in mind. By entering a "rainforest" query, a user may wish to obtain information on traveling to a rainforest, or on purchasing CDs or books having rainforests as a subject or purchasing rainforest themed merchandise such as clothing or accessories.

In another example, a user may enter in a query for a consumer product such as a "Nikon D60." The user is probably not interested in every site referencing Nikon brand cameras, but might be interested in, among other things:

purchasing a Nikon D60 camera;
 reading reviews for the Nikon D60 camera;
 obtaining service for a Nikon D60 camera;
 reading a user manual for the Nikon D60 camera; or
 finding and contacting other owners of Nikon D60 cameras.

If a search engine simply regards a web query as, for example, a "bag of words", the search engine will search for web pages and other data objects (e.g. images, audio files, text files) that contain, or are otherwise associated with, the individual words within the query. A search engine may employ additional techniques known in the art to more narrowly tailor search results and may additionally employ sophisticated algorithms to rank search results. The search engine can use the ranked search results to build one or more search engine result pages. The search engine typically formats the search results into concise summaries for each result using a default formatting scheme. Such formatting schemes typically include a title taken from, for example an HTML title tag of a result page, a brief abstract composed of snippet of text matching the keywords, and a URL hyperlink to the result.

Search results could be significantly enhanced if the likely intent of the query is known. For example, search results may be ranked such that results that are more relevant to the user's intent appear at or near the top of the search results. Perhaps more significantly, however, the user's intent can be used to customize the display and behavior of a search result to be narrowly targeted to a user's intent. An illustrative list of such customizations could include a customized title or abstract for the result or specialized parameters of a displayed clickable URL to provide the landing page with information regarding the user's intent or triggered by the user's intent.

The intent of a user in submitting a query can be inferred using a number of techniques. Such techniques could include linguistic analysis of the query itself. In one embodiment previous queries in the same user session could be utilized, as well as user session, user profile information such as preferences, the set of all queries from all users, and click data from previous sessions for the current user as well as the set of all users. A query may have a number of likely intents which could be ranked in order from most likely to the least likely.

In one embodiment, the ability to tailor the display of search results for a webpage for one or more user intents can be provided through webmaster or $3^{rd}$ party customizable presentation rules. In one embodiment, a presentation rule could be defined schematically as follows:

```
<rule pattern= "object matching pattern">
    <intent type="intent matching pattern">
        <attribute rule>...</attribute rule>
        <attribute rule>...</attribute rule>
        ...
    </intent>
    <intent type="intent matching pattern">
        <attribute rule>...</attribute rule>
        <attribute rule>...</attribute rule>
        ...
    </intent>
    ...
</rule>
```

The object matching pattern is a pattern which can, in one embodiment, be used to match the rule to URLs in search results. For example, in one embodiment, the object matching pattern "*.mywebsite.com/rainforest/*" matches all webpages under "rainforest" on www.mywebsite.com. The object matching pattern could be implemented to support any type of pattern matching known in the art, including literal strings, wildcards, or regular expressions.

Each rule can provide attribute rules for one to many intent matching patterns. Similar to the object matching pattern, in one embodiment, the intent matching pattern can match a rule to an intent in a search result. For example, the pattern "product/*" matches intents "product/purchase" and "product/reviews". The pattern "*/reviews" matches "user/reviews" as well "expert/reviews". The pattern "*" matches any intent, including the unclassified intent. Intent matching patterns could correspond to any reason why a user might be interested in a content provider's website. Such intent could be, for example, "reviews" (product reviews) or "purchase" (purchase products), an unclassified intent, or could be a default intent that matches any user intent. A set of one or more presentation attribute rules can be defined for each intent matching pattern. Presentation attribute rules can be used, without limitation, to enhance the display and functionality of search result pages.

First, the presentation on the search can be enhanced with more relevant titles, snippet, images, and structured attributes of the page, as well as related content such as links. Second, after clicking on a search result, the context of landing page fits the goal of the user. For example, the page can auto-scroll to the appropriate section of the page, or pre-populate a form field. An illustrative list of possible presentation attribute rules is as follows:

| Presentation Attribute Rule | Use |
|---|---|
| Title | Title for the result |
| Abstract | Snippet summarizing the page, rather than the default computed by the search engine. |
| display-url | URL shown on search engine result page. |
| Media | URI to a media object, such as an image, video or audio file. |
| Structured-data | A list of key-value pairs, where the key is the display prompt, the value is displayed next to the prompt. Each element has the attribute key and value. Example keys: price, review, rating, phone number, author, date. |
| links | A list of prompt-link pairs, where each link is a URI to a related page. In this embodiment, the URIs can be on any site. Or the search engine can require they are on the same host. |
| map | Similar to media, show a map if available (generated by the search engine using the location provided in the presentation rule). |
| input | Define an input field to show on the search engine result page to enable passing values to the landing page. The field can be any standard HTML control, such as textbox, drop-down list, checkbox, radio. |
| hover | A list of display attributes to show in a popup that appears when the user mouses over a section of the result that displays a popup while the mouse is in that area. Can include any of the following: title, abstract, media, links, map, and structured-data |
| parameter | A list of parameter-value pairs, to be passed in the query string of the landing page. |

A special token, such as "query", can be specified in any presentation rule to echo the user's query. For example, this could be used to pass the query to a parameter on the landing page as follows:

```
<rule pattern="*.site.com/products/*">
    <intent type="reviews">
        <input type="text" name="p" value=QUERY>
    </intent>
</rule>
```

If the original query is "nikon d60", and the result page is "http://www.amazon.com/products/digitalcameras/nikon/", this rule would change the link on the search engine result page to "http://www.amazon.com/products/digitalcameras/nikon/?p=nikon %20d60", (after html-encoding the URL).

The rule format shown is purely illustrative and is not intended to be limiting. Similar concepts could be expressed using different forms of representation, and such representations are intended to fall within the scope of this disclosure.

In one embodiment, presentation rules can be supplied as a feed or file separate from a website or a webpage to which it relates. Such a feed could be provided as an XML-based file. Other embodiments could use any machine-readable format, such as comma or tab-separated files. An XML schema could be as follows:

```
<?xml version="1.0"?>
<xs:schema xmlns:xs="http://www.w3.org/2001/XMLSchema">
<!-- generic string w/o removing whitespace -->
<xs:simpleType name="valueString">
    <xs:restriction base="xs:string">
        <xs:whiteSpace value="preserve"/>
    </xs:restriction>
</xs:simpleType>
<!-- Limit to the allowed characters:
    ! # $ % & ' * + - . 0 1 2 3 4 5 6 7 8 9
    A B C D E F G H I J K L M N O P Q R S T
    U V W X Y Z ^ _ ` a b c d e f g h i j k
    l m n o p q r s t u v w x y z | ~
-->
<xs:simpleType name="keyvalNameString">
    <xs:restriction base="xs:string">
        <xs:minLength value="1"/>
        <xs:pattern value="[A-Za-z0-9\-_$!*+#%&'\.\^`|~]+"/>
        <xs:whiteSpace value="preserve"/>
    </xs:restriction>
</xs:simpleType>
<!-- sample intent matching pattern: require start with an alpha character OR * to support wildcard prefix -->
<xs:simpleType name="intentPattern">
    <xs:restriction base="xs:string">
        <xs:minLength value="1"/>
        <xs:pattern value="[A-Za-z*].*"/>
    </xs:restriction>
</xs:simpleType>
<!-- URI pattern -->
<xs:simpleType name="URIpattern">
    <xs:restriction base="xs:anyURI">
        <xs:minLength value="1"/>
        <xs:pattern value="[A-Za-z*].*"/>
    </xs:restriction>
</xs:simpleType>
<!-- sample media types -->
<xs:simpleType name="mediaType">
    <xs:restriction base="xs:string">
        <xs:enumeration value="image/png"/>
        <xs:enumeration value="image/gif"/>
        <xs:enumeration value="image/jpeg"/>
        <xs:enumeration value="image/tiff"/>
        <xs:enumeration value="video/mpeg"/>
        <xs:enumeration value="video/quicktime"/>
        <xs:enumeration value="audio/basic"/>
        <xs:enumeration value="audio/mpeg"/>
    </xs:restriction>
</xs:simpleType>
<!-- STRUCTURED-DATA-TYPE -->
<xs:complexType name="STRUCTURED-DATA-TYPE">
    <xs:simpleContent>
        <xs:extension base="valueString">
            <xs:attribute name="name" type="keyvalNameString"/>
        </xs:extension>
    </xs:simpleContent>
</xs:complexType>
<!-- TITLE-TYPE -->
<xs:simpleType name="TITLE-TYPE">
    <xs:restriction base="valueString"/>
</xs:simpleType>
<!-- DISPLAY-URL-TYPE -->
<xs:simpleType name="DISPLAY-URL-TYPE">
    <xs:restriction base="xs:anyURI"/>
```

```
</xs:simpleType>
<!-- ABSTRACT-TYPE -->
<xs:simpleType name="ABSTRACT-TYPE">
   <xs:restriction base="valueString"/>
</xs:simpleType>
<!-- PARAMETER-TYPE -->
<xs:complexType name="PARAMETER-TYPE">
   <xs:simpleContent>
      <xs:extension base="valueString">
         <xs:attribute name="name" type="keyvalNameString"/>
      </xs:extension>
   </xs:simpleContent>
</xs:complexType>
<!-- MEDIA-TYPE -->
<xs:complexType name="MEDIA-TYPE">
   <xs:simpleContent>
      <xs:extension base="valueString">
         <xs:attribute name="type" type="mediaType"/>
      </xs:extension>
   </xs:simpleContent>
</xs:complexType>
<!-- LINK-ITEM-TYPE -->
<xs:complexType name="LINK-ITEM-TYPE">
   <xs:simpleContent>
      <xs:extension base="valueString">
         <xs:attribute name="text" type="valueString" use="required" />
         <xs:attribute name="image" type="xs:anyURI" use="optional" />
      </xs:extension>
   </xs:simpleContent>
</xs:complexType>
<!-- LINK-ITEM-LIST-TYPE -->
<xs:complexType name="LINK-ITEM-LIST-TYPE">
   <xs:sequence>
      <xs:element name="ITEM" type="LINK-ITEM-TYPE" minOccurs="0" maxOccurs="unbounded"/>
   </xs:sequence>
</xs:complexType>
<!-- LINKS-TYPE -->
<xs:complexType name="LINKS-TYPE">
   <xs:complexContent>
      <xs:extension base="LINK-ITEM-LIST-TYPE">
         <xs:attribute name="text" type="valueString" use="optional" />
      </xs:extension>
   </xs:complexContent>
</xs:complexType>
<!-- INPUT-TYPE: won't specify all HTML control syntax in this XSD -->
<xs:simpleType name="INPUT-TYPE">
   <xs:restriction base="xs:string"/>
</xs:simpleType>
<!-- HOVER-TYPE type -->
<xs:complexType name="HOVER-TYPE">
   <xs:sequence>
      <xs:element name="HEADER" type="TITLE-TYPE" minOccurs="0" maxOccurs="1"/>
      <xs:element name="DESCRIPTION" type="ABSTRACT-TYPE" minOccurs="0" maxOccurs="1"/>
      <xs:element name="KEYVALS" type="STRUCTURED-DATA-TYPE" minOccurs="0" maxOccurs="1"/>
      <xs:element name="MEDIA" type="MEDIA-TYPE" minOccurs="0" maxOccurs="1"/>
   </xs:sequence>
</xs:complexType>
<!-- INTENT-TYPE -->
<xs:complexType name="INTENT-TYPE">
   <xs:complexContent>
      <xs:extension base="INTENT-RULE-LIST-TYPE">
         <xs:attribute name="type" type="intentPattern" use="required" />
      </xs:extension>
   </xs:complexContent>
</xs:complexType>
<!-- INTENT-RULE-LIST-TYPE -->
<xs:complexType name="INTENT-RULE-LIST-TYPE">
   <xs:all minOccurs="0">
      <xs:element name="TITLE" type="TITLE-TYPE"/>
      <xs:element name="ABSTRACT" type="ABSTRACT-TYPE"/>
      <xs:element name="DISPLAY-URL" type="DISPLAY-URL-TYPE"/>
      <xs:element name="MEDIA" type="MEDIA-TYPE"/>
      <xs:element name="STRUCTURED-DATA" type="STRUCTURED-DATA-TYPE"/>
      <xs:element name="PARAMETER" type="PARAMETER-TYPE"/>
      <xs:element name="LINKS" type="LINKS-TYPE"/>
      <xs:element name="MAP" type="MEDIA-TYPE"/>
      <xs:element name="HOVER" type="HOVER-TYPE"/>
      <xs:element name="INPUT" type="INPUT-TYPE"/>
   </xs:all>
</xs:complexType>
<!-- RULE-TYPE -->
<xs:complexType name="RULE-TYPE">
   <xs:complexContent>
      <xs:extension base="RULE-LIST-TYPE">
         <xs:attribute name="pattern" type="URIpattern" use="required" />
      </xs:extension>
   </xs:complexContent>
</xs:complexType>
<!-- RULE-LIST-TYPE -->
<xs:complexType name="RULE-LIST-TYPE">
   <xs:sequence>
      <xs:element name="INTENT" type="INTENT-TYPE" minOccurs="0" maxOccurs="unbounded"/>
   </xs:sequence>
</xs:complexType>
<!-- PRESENTATION set -->
<xs:element name="PRESENTATION">
   <xs:complexType>
      <xs:sequence>
         <xs:element name="RULE" type="RULE-TYPE" minOccurs="0" maxOccurs="unbounded"/>
      </xs:sequence>
   </xs:complexType>
</xs:element>
</xs:schema>
```

In another embodiment, presentation rules could be supplied in page markups. In a page markup embodiment, the markup is included in the <head> section of the document to specify rules that apply to the entire document. Alternatively, the markup can be enclosed anywhere in the <body> of the document. The search engine will choose the rules in the same section (such as the enclosing <div> or <span>) of the document that most closely matches the query. The syntax can be otherwise identical to that of the feed format. For example:

```
<head>
<!--
    <presentation>
        <rule pattern= "matching pattern">
        ...
        </rule>
        <rule pattern= "matching pattern">
        ...
        </rule>
        ...
    </presentation>
-->
</head>
```

FIG. 1 illustrates one embodiment of a hardware and network configuration capable of supporting at least one embodiment of the present invention.

A plurality of query users 1200 utilize a conventional web query service, such as that offered by Yahoo! or Google, over a network 1800 such as, for example, the Internet. The web query service is hosted on one or more search engine servers 1400. The web query service can include at least one user interface for the submission of queries by the users 1200 and conventional search engine and search ranking technologies. The search service may, as a part of its normal operation, maintain one or more indexes 1420 of web sites and other resources which are accessible over the network 1800.

Web search services may additionally include intent-based ranking and presentation capabilities, which can include the ability to determine user's 1200 intent in submitting a query and the ability to rank and/or format search result pages using intent based presentation rules. User websites are hosted on website servers 1600. Website source and/or presentation rules can be stored on computer readable media 1620 connected to the website servers 1600. Presentation rules could be defined as one or more feeds (trusted and/or untrusted), could be embedded directly in individual webpages, or both. The presentation rules can be created and maintained by one or more editors, developers, publishers, authors, or advertisers 1640 with an interest in a specific site. Presentation rules could, in some embodiments, be hosted on servers separate from the website, and could, in fact, be maintained by a different organization than that which maintains the website.

The hardware configuration illustrated in FIG. 1 is intended to be exemplary, not limiting, and it is understood that any of the servers shown could represent multiple servers distributed over multiple locations, or alternatively, could represent a single server or cluster of servers implementing all of the functions described.

Figure 2:
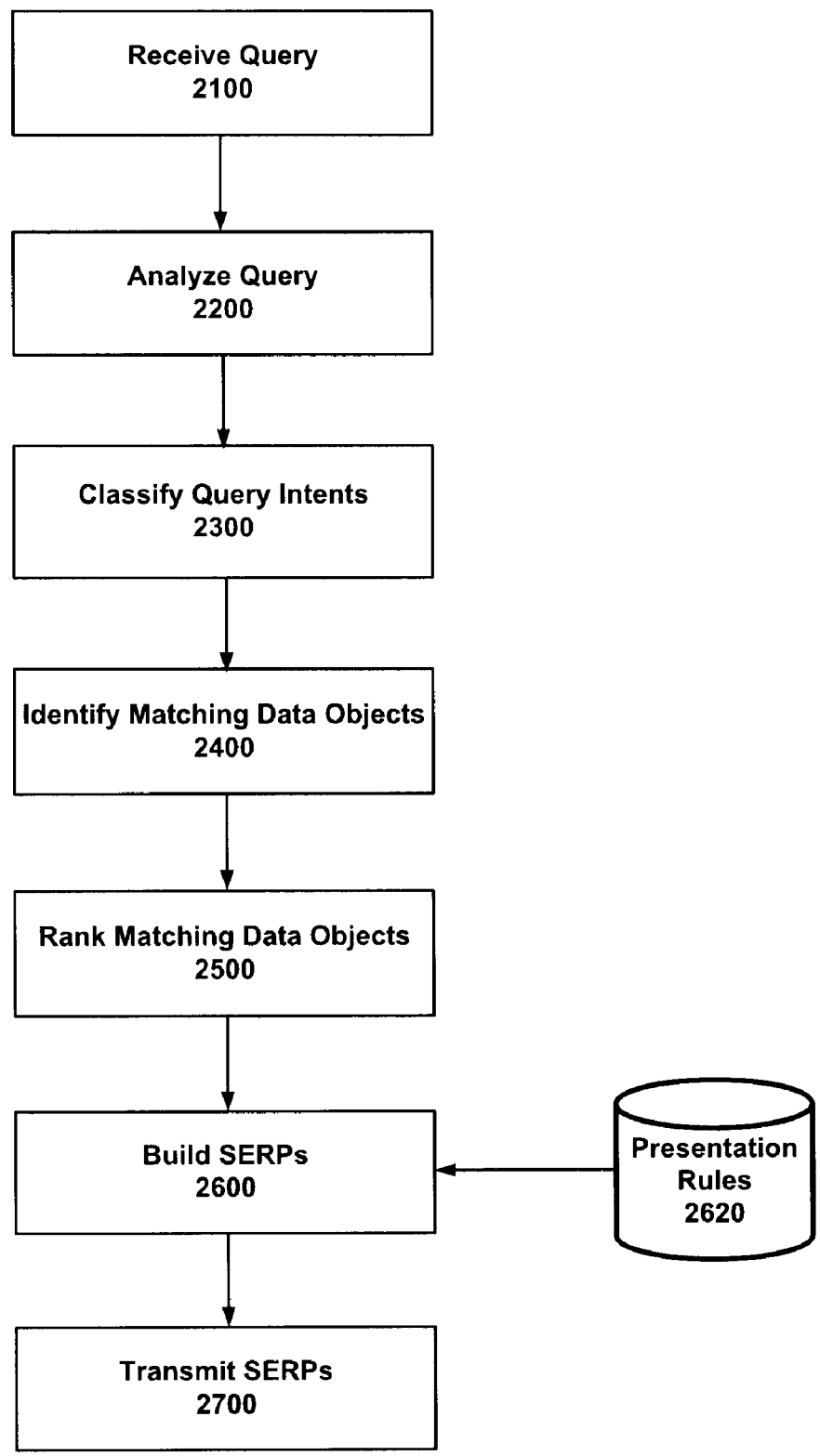
FIG. 2 illustrates a computer-implemented process implementing at least one embodiment of the present invention.

FIG. 2 illustrates a computer-implemented process 2000 implementing at least one embodiment of the present invention.

A query comprising one or more query tokens is received 2100 from a user over a network, such as, for example, the Internet. The query can be entered using any device suitable for the submission of queries over a network. For example, the query can be entered using a client device, such as a computer or mobile/smart phone, using a web browser application or a custom application that uses an API to submit the queries. Query tokens can comprise words, phrases or symbols. Additionally, query syntax could provide for operators or functions.

The query is then analyzed 2200 using at least one computing device and keywords within the query are identified. The query is parsed into tokens, and the tokens can be analyzed to identify common entities, phrases, spelling errors, synonyms, variants of stems, and noisewords (e.g. "the", "a", "in").

The query is then classified into one or more likely intents, which can include an unclassified intent when no defined intents match the query 2300. An intent is a mapping from many combinations of keywords to a relatively small set of common goals that users pursue in a search query or session of multiple queries. Often, the intent of the query is not explicitly stated in the keywords. While the space of possible queries, is very large, the set of intents is much smaller. Examples of intents relating to product queries can be, for example: official-site, research, purchase, dealer, support, or reviews. Examples of intents relating to local/map queries: directions, reviews, phone, hours-of-operation. In one embodiment, query intent may be determined by linguistic analysis of query keywords. In one embodiment, previous queries in the user session, user profile information such as preferences, the set of all queries from all users or any subset of all users (e.g. a subset of users having specific demographics or usage patterns), and click data from previous sessions for the current user as well as the set of all users or any subset of all users are used to determine query intent.

A plurality of data objects accessible to the network that match the query are then identified 2400 using the computing device. Such data objects could be documents such as web pages, or could be any other type of data object, such as media objects, having at least one property by which such objects could be matched to a query. The data objects could be matched to the query using any conventional search engine technology known in the art, such as, for example, using a bag of words type to match query keywords to data objects.

The identified documents are then ranked 2500 by the computing device. In one embodiment, the data objects are ranked using any ranking algorithm known in the art, such as, for example, term counts, frequency within the corpus of documents, and quality of the site/page based on link analysis. In one embodiment, intent may be used to rank a document in a specialized ranking function rather than a traditional {query,document} score. In order to increase the probability of meeting the user's goal, one or more documents may be included that matches highly against the 2nd or 3rd most likely intent, not just the most likely intent, based on a variety of features. While this approach lowers the probability that the result matched against the less likely intent is the best one on average, it increases the marginal probability that the user gets at least one relevant result in the result set. In another embodiment, a score is assigned for each candidate result against multiple intents. In either case, once the final result set is computed, each result has a corresponding relevance score for each possible intent.

In one embodiment, intent can be embedded in the search result set, for example:

```
 result URL </URL>
        <INTENT>intent type</INTENT>
    </RESULT>
    <result>
        <URL> result URL </URL>
        <INTENT>intent type</INTENT>
    </RESULT>
    ...

```

One or more search engine result pages (SERPs) are then built 2600 by the computing device using the ranked result set and are transmitted over the network to the querying user 2700. In one embodiment, duplicates are removed from the result set and summaries of each result are prepared for presentation on the result page. In one embodiment, the summary can include elements of the associated document or landing page, such as title, URL, and/or snippets of text from the page. In addition, the summary can include images, related links, and structured information from the document or related documents.

In addition to the standard sources for constructing the presentation on search engine result page, the search engine applies presentation rules 2620 that map the intent of the query to presentation elements. In one embodiment, presentation rules contain one or more presentation attribute rules that can include all of the standard elements of a search engine result page, such as title, URL, images, related links, and structured information applicable to the associated document.

In one embodiment, the intent is represented as a string and the presentation rules represent the left-hand side of the rule as a string. In one embodiment, for each result in the result set, the intent is determined that is the highest-scoring intent based on query analysis. The highest-scoring intent is then used to match presentation rules. In one embodiment, if the presentation rules are supplied as a feed, the URL of each result can be matched against rule patterns to select candidate presentation rules. If presentation rules are embedded in a result page, such rules can be automatically selected.

The intent of the result is then matched against intent matching patterns defined within the selected rules. If one or more matches are found, the attribute rules associated with such matching intents are applied to the result to generate the display of the result on the search result page. In one embodiment, if more than one rule matches a result, such rules are applied in the most-specific order first, from section-specific to page-specific or URL-specific, to wildcard or regular expressions. Similarly, embedded rules may take precedence over feed-based rules. In addition, the source of the feed may be considered to prioritize the rules. For example, some rules might be supplied by a "trusted" source that should take precedence even over embedded rules.

The presentation rules can be specified via a feed, which maps URIs (or patterns based on standard rules such as wildcards or regular expressions) to rules. While such a rule can simple to specify, it might be harder to maintain, as it is separate from the web pages, and therefore might not be synchronized with the web site nor the crawler/index of search engines. One alternative is inline markup of the document with the appropriate rule or rules. This has the advantage of being synchronized with the target document, but requires marking up every document.

Figure 3:
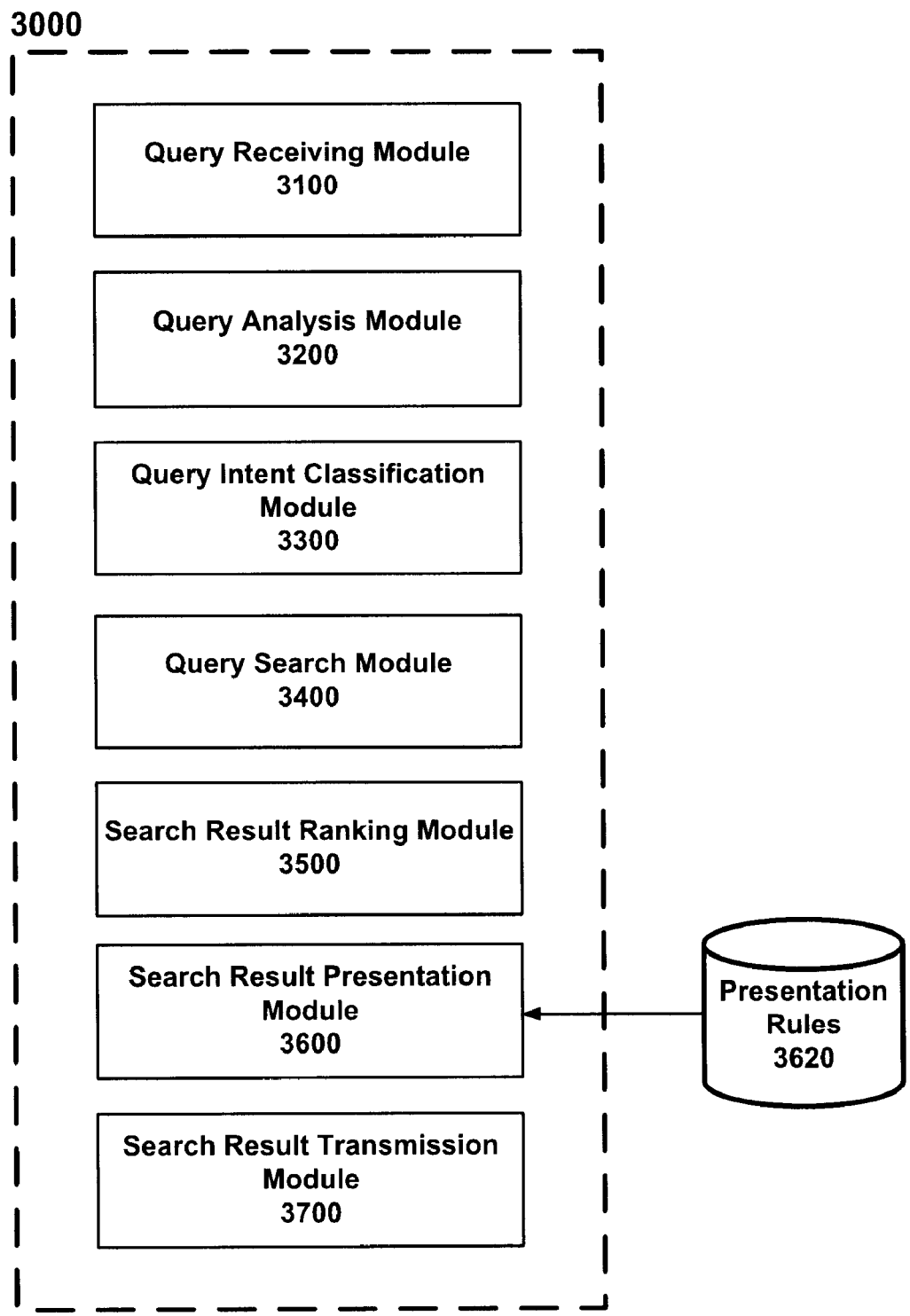
FIG. 3 illustrates one embodiment of a modular implementation of the process shown in FIG. 2 which can be implemented on one or more computing devices.

FIG. 3 illustrates one embodiment of a modular implementation 3000 of the process shown in FIG. 2 which can be implemented one or more computing devices. The system comprises a query receiving module 3100, a query analysis module 3200, a query intent classification module 3300, a query search module 3400, a search result ranking module 3500, a search result presentation module 3600, and a search result transmission module 3700.

In one embodiment, each of the modules comprises one or more processors programmed to execute software code retrieved from a computer readable storage medium storing software for functions as described below. In one embodiment, each of the modules could be implemented on servers such as the search engine servers 1400 in FIG. 1. Such an embodiment is purely exemplary, and all of the modules shown could be implemented in any combination on any number servers, as will be readily apparent to those skilled in the art.

The query receiving module 3100 is configured to receive queries comprising one or more query tokens from users over a network such as, for example, the Internet. Query tokens can comprise words, phrases or symbols. Additionally, query syntax could provide for operators or functions.

The query analysis module 3200 is configured to analyze queries received by the query receiving module 3100 to identify keywords within the queries. Queries can be parsed into tokens, and the tokens can be analyzed to identify common entities, phrases, spelling errors, synonyms, variants of stems, and noisewords (eg "the", "a", "in").

The query intent classification module 3300 is configured to classify queries parsed by the query analysis module 3300 into one or more likely intents (which could include an unclassified intent). In one embodiment, query intent may be determined by linguistic analysis of query keywords. In one embodiment, previous queries in user sessions, user profile information such as preferences, the set of all queries from any subset of all users (e.g. a subset of users having specific demographics or usage patterns), and click data from previous sessions for current users as well as any subset set of all users can be used to determine query intent.

The query search module 3400 is configured to identify data objects accessible to the network that match queries classified by the query intent classification module 3300. Such data objects could be documents such as web pages, or could be any other type of data object, such as media objects, having at least one property by which such objects could be matched to a query. The data objects could be matched to the query keywords using any conventional search engine technology known in the art such as a bag of words type match.

The search result ranking module 3500 is configured to the data objects identified by the query search module 3400. In one embodiment, the data objects can be ranked using any ranking algorithm known in the art, such as, for example, term counts, frequency within the corpus of documents, and quality of the site/page based on link analysis. In one embodiment, intent may be used to rank a document in a specialized ranking function rather than a traditional {query,document} score. In order to increase the probabability of meeting the user's goal, one or more documents can be included that matches highly against the 2nd or 3rd most likely intent, not just the most likely intent, based on a variety of features. In another embodiment, a score is assigned for each candidate result against multiple intents. In either case, once the final result set is computed, each result has a corresponding relevance score for each possible intent.

The search result presentation module 3600 is configured to build search engine result pages using the data objects ranked by the search result ranking module 3500 for presentation to querying users. In one embodiment, duplicates are removed from the result set and summaries of each result are prepared for presentation on the result page. In one embodiment, the summary can include elements of the associated document or landing page, such as title, URL, snippets of text from the page. In addition, the summary can include images, related links, and structured information from the document or related documents.

In addition to the standard sources for constructing the presentation on search engine result page, the search engine can apply presentation rules that map the intent of the query to presentation elements. In one embodiment, presentation rules contain one or more presentation attribute rules that can include all of the standard elements of a search engine result page, such as title, URL, images, related links, and structured information applicable to the associated document. In one embodiment, the intent can represented as a string and the presentation rules represent the left-hand side of the rule as a string. In one embodiment, for each result in the result set, the intent, which is the highest-scoring intent based on query analysis for the result is determined. The highest-scoring intent is then used to match presentation rules.

The presentation rules could be specified via a feed that maps URIs (or patterns based on standard rules such as wildcards or regular expressions) to rules. Alternatively, presentation rules could be specified via inline markup of documents with the appropriate rule or rules.

In one embodiment, if the presentation rules are supplied as a feed, the URL of each result can be matched against rule object matching patterns to select candidate presentation rules. If presentation rules are imbedded in a result page, such rules can be automatically selected. The intent of the result is then matched against intent matching patterns defined within the selected rules. If one or more matches are found, the attribute rules associated with such matching intents are applied to the result to generate the display of the result on the search result page. In one embodiment, if more than one rule matches a result, such rules can applied in the most-specific order first, from section-specific to page-specific or URL-specific, to wildcard/regular expression. Similarly, embedded rules may take precedence over feed-based rules. In addition, the source of the feed may be considered to prioritize the rules. For example, some rules might be supplied by a "trusted" source that should take precedence even over embedded rules The search result transmission module 3700 is configured to transmit search engine result pages that have been prepared for presentation by the search result presentation module 3600 to end users.

AN ILLUSTRATIVE EXAMPLE

For this example, consider the query: "nikon d60". Although it wasn't specified explicitly by the user, here are examples of likely intents in a partial intent taxonomy that could be identified when the query is analyzed.
Product
official-site
research
purchase
dealer
support
reviews When the query is used by a search engine to search for matching documents, a result set which includes a top ranked intent for each result could be produced as follows:

```
http://www.nikonusa.com/Find-Your-
Nikon/Product/Digital-SLR/25438/D60.html
        </URL>
        <INTENT>official-site</INTENT>
    </RESULT>
    <result>
        <URL>http://www.kenrockwell.com/nikon/d60.htm</URL>
        <INTENT>reviews</INTENT>
    </RESULT>

```

The results additionally could be ranked using intent, for example, using top-scoring intents. In one embodiment, the search engine could generate a default search result presentation for each result before intent based presentation rules are applied, retaining the intents from the previous step.

```
http://www.nikonusa.com/Find-Your-
Nikon/Product/Digital-SLR/25438/D60.html
        </URL>
        <title><b>D60</b> from <b>Nikon</b></title>
        <INTENT>official-site</INTENT>
        <abstract>Find Your <b>Nikon D60</b> Digital SLR Cameras</abstract>
    </RESULT>
    <result>
        <URL>http://www.kenrockwell.com/nikon/d60.htm</URL>
        <title><b>Nikon</b><b>D60</b></title>
        <INTENT>reviews</INTENT>
        <abstract>The <b>Nikon</b> <b>D60</b> is an inexpensive 10 MP DSLR that comes with an excellent 18-55mm...</abstract>
    </RESULT>
    ...

```

Assume the following presentation rules have been defined by or for the "www.kenrockwell.com" website. The first rule is a wildcard rule that matches all Nikon related pages on the website using the pattern "*.kenrockwell.com/nikon/*". The second rule a page specific rule that only matches a single webpage using the pattern "*.kenrockwell.com/nikon/d60.htm".

```
<PRESENTATION>
    <RULE pattern="*.kenrockwell.com/nikon/*">
        <INTENT type="reviews">
            <TITLE>Your source for objective Nikon reviews</TITLE>
            <LINKS text="Consider these products">
                <ITEM text="D60">http://www.kenrockwell.com/nikon/d60.htm</ITEM>
                <ITEM text="D40">http://www.kenrockwell.com/nikon/d40.htm</ITEM>
                <ITEM text="d40x">http://www.kenrockwell.com/nikon/d40x.htm</ITEM>
                <ITEM text="More reviewsâ€¦">http://www.kenrockwell.com/nikon/index.htm</ITEM>
            </LINKS>
        </INTENT>
    </RULE>
    <RULE pattern="*.kenrockwell.com/nikon/d60.htm">
        <INTENT type="reviews">
            <MEDIA>http://www.kenrockwell.com/images/Nikon/d60.jpg</MEDIA>
            <PARAMETER>model=d60</PARAMETER>
            <LINKS text="Features of the Nikon D60">
                <ITEM text="Stabilization">http://www.kenrockwell.com/nikon/d60-stabilization.htm</ITEM>
                <ITEM text="Fast-frame">http://www.kenrockwell.com/nikon/d60-fastframe.htm</ITEM>
            </LINKS>
        </INTENT>
        <INTENT type="purchase">
            <LINKS text="Where to buy:">
                <ITEM text="Ritz Camera">http://www.ritzcamera.com/p/?keyword=Nikon+D60&id=ABG 1022</ITEM>
                <ITEM text="Amazon">http://www.amazon.com/dp/B0012OGF6Q/?tag=kenrockwellcom</ITEM>
            </LINKS>
        </INTENT>
    </RULE>
</PRESENTATION>
```

The second result in the result set, <URL>http://www.kenrockwell.com/nikon/d60.htm</URL>, matches both of the rules. In this example, the second rule takes precedence since it is more specific. In one embodiment, only the highest precedence rule is applied. In another embodiment, all applicable rules may be applied if they modify different presentation attributes. In one embodiment, rule precedence can be determined, as in the example above, based on the relative specificity of the rules. Other rule properties could also be used in addition, or in place of, relative specificity to determine precedence. In one embodiment, an explicit precedence could be coded into the rule (e.g. <PRECEDENCE> number </PRECEDENCE>). On one embodiment, rules originating from trusted feeds could take precedence over rules from untrusted feeds and/or embedded rules. In one embodiment embedded rules and rules from one or more feeds could be applied if they modify different presentation attributes.

In this example, the general rule modifies the title and links, while the specific rule modified media, parameter, and links. In this example, both rules will be applied. Since the second rule is more specific, the links will be used from that rule. Note the rule intentionally specifies different links, which are specific to the model of camera on that page. In some embodiments, one or more matching rules may not be applied by the search engine, based on a variety of features, such as click data, user profile, or other presentation rule success metrics, to improve the search experience. In this example, the final result could be:

```
http://www.nikonusa.com/Find-Your-
Nikon/Product/Digital-SLR/25438/D60.html
        </URL>
        <title><b>D60</b> from <b>Nikon</b></title>
        <abstract>Find Your <b>Nikon D60</b> Digital SLR
Cameras</abstract>
    </RESULT>
    <result>
        <URL>http://www.kenrockwell.com/nikon/d60.htm?model=d60
        </URL>
        <title>Your source for objective Nikon reviews</title>
        <abstract>The <b>Nikon</b> <b>D60</b> is an inexpensive 10
MP DSLR that comes with an excellent 18-55mm...</abstract>
        <links text="Features of the Nikon D60">
            <item text="Stabilization">http://www.kenrockwell.com/
            nikon/d60-stabilization.htm</item>
            <item text="Fast-frame">http://www.kenrockwell.com/
            nikon/d60-fastframe.htm</item>
        </links>
        <media>http://www.kenrockwell.com/images/Nikon/d60.jpg</media>
    </RESULT>
    ...

```

In this case, the result is the product of a combination of the first, more general presentation rule (the title), the second, more specific presentation rule (the URL parameter, the image, and the links) and default search engine result formatting (the remainder).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A method comprising the steps of:
    receiving, over a network, a query from a user, the query comprising at least one query token;
    analyzing the query, using at least one computing device, to identify at least one query keyword;
    determining, at least the one computing device, a plurality of intents from the at least one keyword, each of the plurality of intents indicates a type of information regarding the query keyword that is likely to be desired by a user submitting the query;
    classifying the query, using the at least one computing device, into at least one of the plurality of intents;
    identifying, using the at least one computing device, a plurality of data objects available over the network that match the at least one query keyword;
    assigning, using the at least one computing device, at least one of the plurality of intents to at least some of the plurality of data objects;
    ranking, using the at least one computing device, the plurality of data objects;
    building a result, using the at least one computing device, using the ranked plurality of data objects, the result comprises a plurality of display entries, at least one display entry customized to a respective assigned intent is constructed for each of the ranked plurality of data objects; and
    transmitting the result, over the network, to the user.

2. A computer-readable medium having computer-executable instructions for a method comprising the steps of:
    receiving, over a network, a query from a user, wherein the query comprising at least one query token;
    analyzing the query, using at least one computing device, to identify at least one query keyword;
    determining a plurality of intents, by the computing device, from the at least one keyword, each of the plurality of intents indicates a type of information regarding the query keyword that is likely to be desired by a user submitting the query;
    classifying the query, using the at least one computing device, into at least a subset of the plurality of intents;
    identifying, using the at least one computing device, a plurality of data objects available over the network that match the at least one query keyword;
    assigning, using the at least one computing device, at least one of the plurality of intents to at least some of the plurality of data objects;
    ranking, using the at least one computing device, the plurality of data objects;
    building a result, using the at least one computing device, using the ranked plurality of data objects, the result comprises a plurality of display entries, wherein at least one display entry customized to a respective assigned intent is constructed for each of the ranked plurality of data objects; and
    transmitting the result, over the network, to the user.

3. The method of claim 1 wherein the at least one intent comprises an unclassified intent.

4. The method of claim 1 wherein the analysis step identifies query keywords by parsing the tokens and identifying common entities, phrases, spelling errors, synonyms, variants of stems, and noisewords.

5. The method of claim 1 wherein, in the classifying step, the query is classified by linguistic analysis of the at least one query keyword.

6. The method of claim 1 wherein, in the classifying step, profile information for the user is additionally used to classify the query.

7. The method of claim 1 wherein, in the classifying step, previous queries submitted by the user during a user session are additionally used to classify the query.

8. The method of claim 1 wherein, in the classifying step, previous queries submitted by a subset of all users are additionally used to classify the query.

9. The method of claim 1 wherein, in the classifying step, click data from at least one previous user session for the user are additionally used to classify the query.

10. The method of claim 1 wherein, in the classifying step, click data from at least one previous user session for a subset of all users are additionally used to classify the query.

11. The method of claim 1 wherein the plurality of data objects are ranked by intent.

12. The method of claim 1 wherein, in the building step, each of the ranked plurality of data objects to which at least one intent has been assigned are matched against at least one presentation rule associated with the respective data object and matching presentation rules are used to construct the at least one display entry for the respective data object.

13. The method of claim 12 wherein the at least one presentation rules are supplied via a feed.

14. The method of claim 12 wherein the at least one presentation rules are embedded in the respective data object.

15. The method of claim 12 wherein the at least one presentation rules comprise an object matching pattern and at least one set of attribute rules, wherein each of sets of attribute rules is associated with an intent matching pattern, and wherein the at least one presentation rules matches one of the plurality of data objects if a name of the respective object matches the object matching pattern and the at least one intent assigned to the respective data object matches the intent matching pattern associated with the at least one set of attribute rules, wherein the at least one set of attribute rules are used to construct the at least one display entry for the respective data object.

16. The method of claim 12 wherein at least one of the ranked plurality of data objects matches at least two presentation rules and each of the at least two presentation rules are used to construct the at least one display entry for the respective data object.

17. The method of claim 12 wherein at least one of the ranked plurality of data objects matches a first at least one presentation rule originating from a trusted feed and a second at least one presentation rule originating from an untrusted feed, wherein the first at least one presentation rule is used before the second at least one presentation rule.

18. The method of claim 12 wherein at least one of the ranked plurality of data objects matches a first at least one presentation rule originating from a trusted feed and a second at least one presentation rule embedded in the respective data object, wherein the first at least one presentation rule is used before the second at least one presentation rule.

19. The method of claim 15 wherein the at least one intent associated with at least one of the ranked plurality of data objects comprises at least two intents and one of the at least two intents which is most likely is used to match the respective data object to the at least one presentation rules.

20. The method of claim 16 wherein the at least two presentation rules are used in the most specific order first to construct the at least one display entry for the respective data object.

21. The method of claim 16 wherein the at least two presentation rules each additionally comprise a rule precedence and the at least two presentation rules are used in precedence order to construct the at least one display entry for the respective data object.

22. The computer-readable medium of claim 2 wherein, in the building step, each of the ranked plurality of data objects to which at least one intent has been assigned are matched against at least one presentation rule associated with the respective data object and matching presentation rules are used to construct the at least one display entry for the respective data object.

23. The computer-readable medium of claim 22 wherein the at least one presentation rules comprise an object matching pattern and at least one set of attribute rules, wherein each of sets of attribute rules is associated with an intent matching pattern, and wherein the at least one presentation rules matches one of the plurality of data objects if a name of the respective object matches the object matching pattern and the at least one intent assigned to the respective data object matches the intent matching pattern associated with the at least one set of attribute rules, wherein the at least one set of attribute rules are used to construct the at least one display entry for the respective data object.

\* \* \* \* \*